United States Patent [19]

Ryan et al.

[11] Patent Number: 5,576,916
[45] Date of Patent: Nov. 19, 1996

[54] MAGNETIC HEAD-TO-MEDIA BACKER DEVICE

[75] Inventors: Dale W. Ryan; David L. Rowden; Thomas C. Merle, all of Rochester, N.Y.

[73] Assignee: Eastman Kodak Company, Rochester, N.Y.

[21] Appl. No.: 431,708

[22] Filed: Apr. 28, 1995

[51] Int. Cl.$^6$ .................................................. G11B 15/62
[52] U.S. Cl. ........................ 360/130.31; 360/130.32
[58] Field of Search ....................... 360/130.3, 130.31, 360/130.32, 130.33, 130.34, 132, 3; 235/449, 483, 484, 485

[56] References Cited

U.S. PATENT DOCUMENTS

| | | | |
|---|---|---|---|
| 2,644,690 | 7/1953 | Krag | 360/130.31 |
| 3,405,945 | 10/1968 | Braeth | 360/3 |
| 4,297,735 | 10/1981 | Eppich | 360/130.3 |
| 4,638,392 | 1/1987 | Akutsu | 360/130.32 |
| 5,034,836 | 7/1991 | DeMarti, Jr. et al. | 360/3 |
| 5,274,522 | 12/1993 | Taillie | 360/130.3 |
| 5,285,324 | 2/1994 | Weigand et al. | 360/3 |
| 5,285,325 | 2/1994 | Kiesow | 360/3 |

FOREIGN PATENT DOCUMENTS

| | | | |
|---|---|---|---|
| 54-105505 | 8/1979 | Japan | 360/130.31 |
| 980154 | 12/1982 | U.S.S.R. | 360/130.31 |

*Primary Examiner*—Stuart S. Levy
*Assistant Examiner*—David L. Ometz
*Attorney, Agent, or Firm*—Cumston & Shaw

[57] ABSTRACT

A magnetic head-to-media backer device for holding a spring member, the spring member being adapted to urge a flexible magnetic media into contact with a magnetic head, is described, in which the device has a frame for holding the spring member therein, the frame having a cavity defined at least by a pair of opposite generally convex shaped side walls for bending the spring member into an arc with two opposite leg portions and a center portion, the center portion of the spring member protruding from an opening to the cavity to permit it to be depressed at least part way into the opening to conform the leg portions substantially against the surface of the side walls.

18 Claims, 2 Drawing Sheets

MAGNETIC HEAD-TO-MEDIA BACKER DEVICE

FIELD OF THE INVENTION

This invention relates to a magnetic media edge follower device and more particularly to a magnetic head-to-media backer device for reliable magnetic function and media handling.

BACKGROUND OF THE INVENTION

The basic function of a magnetic media follower device is to control the intimate contact between the magnetic head and the magnetic media, such as a photographic film or magnetic tape. To accomplish this there are two primary functional requirements. A load applying member, frequently in the form of a leaf or reed like spring, forces the media against the surface of the head for magnetic reading or writing. The second is the ability for the assembly to track the edge of the media by means of a follower unit so that variations in the cut quality of the media or inaccuracies due to splicing of media do not impact the positioning of the head relative to the edge of the media.

The load applying member may be in the form of a reed like backer or an arched spring which is held in a rigid frame with a cavity designed to hold the spring bent in an arc with opposite legs of the spring captured within the cavity, and the center portion of the spring protruding from an opening to the cavity and bearing on the magnetic media. Known cavity designs with angled walls are inadequate for supporting the spring during engagement with high friction media because the spring tends to conform to the interior cavity shape resulting in functional failure of the spring. Another problem with cavity design is that adequate features are lacking for constraining the spring from rotation about the center hole when high friction media is passed through the interface between the spring and the magnetic head.

A consideration in designing magnetic follower devices for photo finishing equipment which are subject to extensive use and wear is that the component parts such as the arched spring and worn magnetic heads be replaceable without requiring full disassembly of the mechanical unit. In a two-head device it is desirable to have an inventory of critical parts that can be used on either side of the assembly and to minimize parts with left and right hand components U.S. Pat. No. 2,644,690 discloses a presser and tape guide assembly comprising a symmetrical presser shoe or head mounted on a non-symmetrical body that has differently shaped tape guide wings that engage the tape ahead of and beyond the magnetic head. There is no suggestion that the body is a cover plate or that this construction be used in a two-head device.

U.S. Pat. No. 5,034,836 discloses a magnetic head suspension apparatus for use with photographic film which includes a movable support mounted for movement through an arc having a predetermined radius and a pair of magnetic head suspension assemblies each rotatably mounted on the moveable support. The suspension assemblies are biased towards each other to cause surfaces of the magnetic head assemblies to engage opposite edges of a photographic film respectively. The entire assembly is formed of symmetrical components.

U.S. Pat. No. 5,274,522 discloses a magnetic head-to-media backer device comprising a member adapted to urge a flexible magnetic media into contact with a magnetic head. The rigid frame for holding the member has a cavity and various embodiments of the cavity are described.

U.S. Pat. No. 5,285,324 discloses a magnetic reading and/or recording apparatus which includes a plurality of magnetic reading and/or recording elements to read and/or record information from/on a flexible magnetic recording material, and a flexible plate. A means for arranging the elements and the flexible plate to contact the magnetic recording material with the elements is included, the arranging means includes a pressure pad mounting block having a recess to accept the flexible plate.

U.S. Pat. No. 5,285,325 discloses a two-headed magnetic recording or playback assembly for a camera that includes two symmetrical pressure pad mounting blocks.

It is an objective of this invention to provide a magnetic head-to-media backer device with a cavity designed to prevent functional failure of a spring member.

It is an objective of this invention to provide a magnetic head-to-media backer device with a cavity designed to prevent rotation of a spring member.

SUMMARY OF THE INVENTION

Briefly stated and in accordance with one aspect of the invention there is provided a magnetic head-to-media backer device for holding a spring member, the spring member being adapted to urge a flexible magnetic media into contact with a magnetic head, comprising, a frame for holding the spring member therein, the frame having a cavity defined at least by a pair of opposite generally convex shaped side walls for bending the spring member into an arc with two opposite leg portions and a center portion, the center portion of the spring member protruding from an opening to the cavity to permit it to be depressed at least part way into the opening to conform the leg portions substantially against the convex surface of the side walls.

In a preferred embodiment of the invention the device has in addition, a retention support with a base upstanding in the cavity, the retention support base spaced from the opposite side walls to constrain the leg portions of the spring member between the retention support base and the opposite side walls whereby significant rotation of the spring about the opening is prevented, and the retention support spaced from the cavity opening so that the center portion of the depressed spring and the retention support remain separated.

In yet another aspect of the invention there is provided a magnetic head-to-media backer device for holding a spring member, the spring member being adapted to urge a flexible magnetic media into contact with a magnetic head comprising, a frame for holding the spring member therein, the frame having a cavity defined at least by a pair of opposite side walls for bending the spring member into an arc with two opposite leg portions and a center portion, the center portion of the spring member protruding from an opening to the cavity to permit it to be depressed at least part way into the opening to conform the leg portions substantially against the surface of the side walls; and a retention support with a base upstanding in the cavity, the retention support base spaced from the opposite side walls to constrain the leg portions of the spring member between the retention support base and the opposite side walls whereby significant rotation of the spring about the opening is prevented, and the retention support spaced from the cavity opening so that the center portion of the depressed spring and the retention support remain separated.

The novel aspects of this invention are set forth with particularity in the appended claims. The invention itself, together with further objects and advantages thereof may be more fully comprehended by reference to the following derailed description of a presently preferred embodiment of the invention taken in conjunction with the accompanying drawings.

DETAILED DESCRIPTION OF THE INVENTION

This invention is disclosed for a magnetic head-to-media backer device which is incorporated in a magnetic media edge follower device as a component of a magnetic head-to-media backer assembly. This description is directed in particular to those components forming part of or directly cooperating with the disclosed embodiment of the invention.

Figure 1:
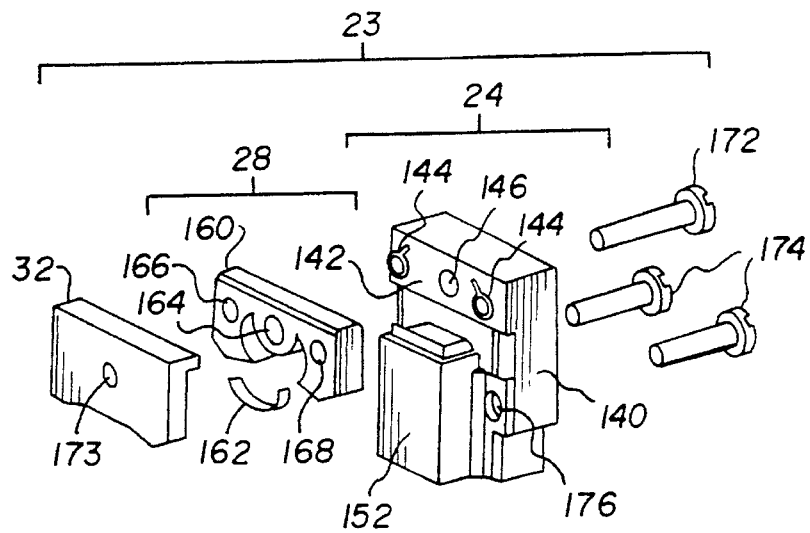
FIG. 1 is an exploded perspective view of a magnetic head-to-magnetic media backer assembly.

Referring to the drawings and more specifically to FIG. 1, there is disclosed an embodiment of a magnetic head-to-media backer assembly 23 which comprises a head and backer sub-assembly 24, a magnetic head-to-media backer device (also called an arched spring assembly) 28 and film guide cover plate 32.

A critical parameter for head to media contact is the positional control of the arched spring (and its rigid frame holder) relative to the gap of the magnetic head. The disclosed embodiment of the backer plate 140 utilizes two round locating pins 144 on the inner side 142 of the plate for engaging corresponding locating holes 166, 168 in the frame 160 of the arched spring assembly 28. In a preferred embodiment one of the locating holes is a round hole and the other is a generally obround shaped slot. The width of the obround shaped slot is the same diameter as the round hole diameter while the length of the obround hole is slightly greater than the diameter to allow for slight variations in the spacing between the locating pins. This hole pattern allows for very accurate and repeatable positioning of the arched spring relative to the magnetic head.

An important consideration for magnetic head-to-media interface equipment is the ability to replace damaged arched springs and worn magnetic heads without requiring full disassembly of the mechanical unit. If replacement of the arched spring 162 is required, the entire arched spring assembly is removed after screw 172 is withdrawn from the mounting holes, 146 in the backer plate, 164 in the frame of the arched spring assembly and tapped hole 173 of the film guide cover plate 32, and is removed. A new arched spring assembly is then positioned on the locating pins and the cover plate and screw are reassembled. If an entire magnetic head-to media backer assembly 23 needs replacement, the head and backer sub-assembly 24 can be removed from a larger assembly by removing the two remaining screws 174 which are used to attach the assembly 23 to the larger assembly through the mounting holes 176. The film guide cover plate, arched spring assembly and head and backer sub-assembly can be removed and replaced with a new entire magnetic head-to media backer assembly. This approach allows for the replacement of a single assembled unit that contains all the critical alignments and positionings of the magnetic head relative to the arched spring. In addition, this replacement scheme requires no further disassembly of the critical moving elements or critical interfaces that are part of the larger assembly.

For both the head and backer assembly and the arched spring cavity, the design allows for assembly on either side of the follower unit, i.e. left or right. This offers a significant advantage to a photo finisher since it is only required to inventory a single version of each replacement part.

U.S. Pat. No. 5,274,522 discloses magnetic head-to-media backer devices.

Figure 2:
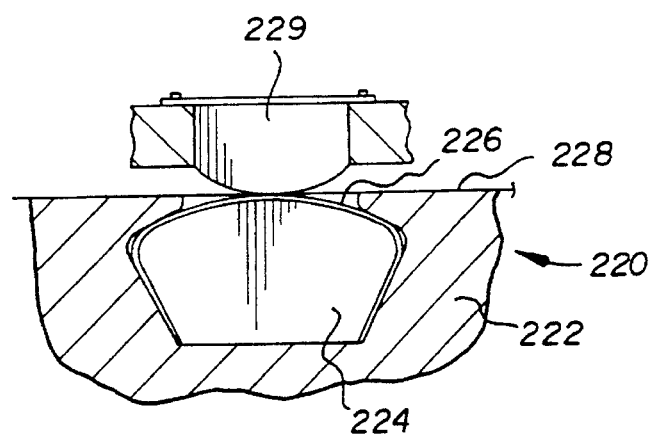
FIG. 2 is a front elevation view of known magnetic head-to-media backer device.

Referring to FIG. 2, there is illustrated a known ('522) magnetic head-to-media backer assembly which includes a magnetic head-to-media backer device 220 with a rigid frame 222 in which the arched spring cavity 224 configuration is that of an irregular hexagon with acutely angled, sharp corners. The device further comprises an elastically deformable reed-like backer member (or arched spring) 226 adapted to urge a flexible magnetic media 228 into contact with a magnetic head 229. When such a backer device is used with high friction media the spring 226 tends to conform to the interior cavity shape resulting in stressing of the spring at the corners, permanent deformation of the spring and functional failure of the spring. Another problem with this device is that the spring also tends to rotate about the center hole when high friction media is used.

Figure 3:
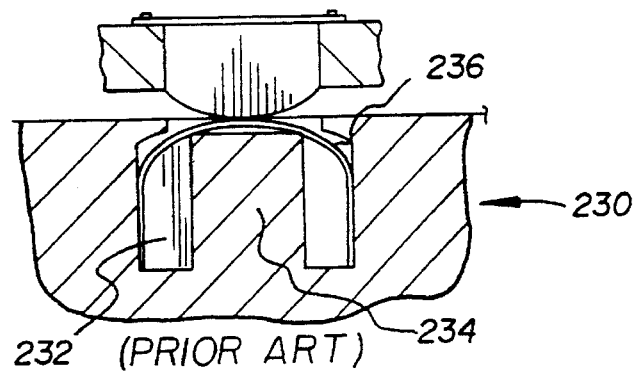
FIG. 3 is a front elevation view of known magnetic head-to-media backer device having a media support lug.

Referring to FIG. 3 there is illustrated another known ('522) magnetic head-to-media backer device 230 with an inverted generally U-shaped cavity 232 with a support member 234 designed to contact the middle of the spring 236 when it is deformed into the opening of the cavity. Similarly, the problems with this device are that the frame walls are acutely angled and the spring also tends to rotate about the center hole when high friction media is used because the space between the frame wall and the support wall is large.

Figure 4:
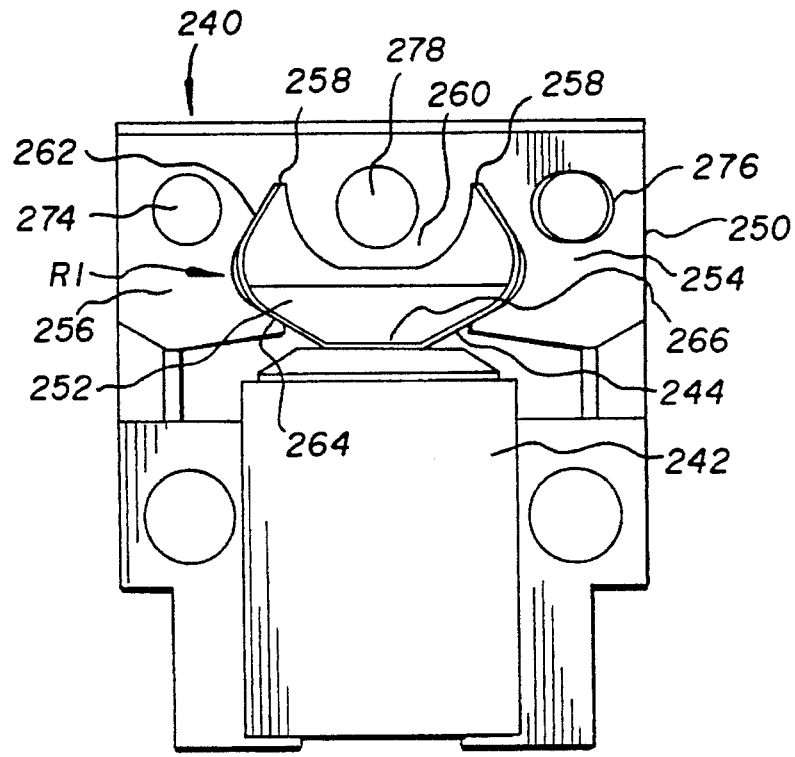
FIG. 4 is a front elevation view of a first embodiment of a magnetic head-to-media backer device.
Figure 5:
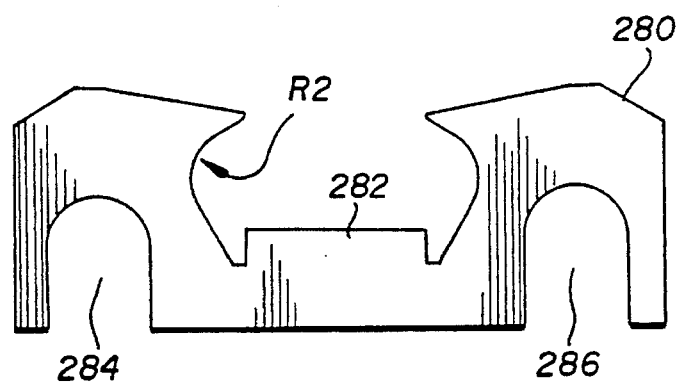
FIG. 5 is a front elevation view of a second embodiment of a magnetic head-to-media backer device.

The magnetic head-to-media backer device of the invention includes a frame which is designed to prevent permanent deformation of the spring by improving the interior contour of the cavity. In a preferred embodiment of the invention the frame is designed to prevent rotation of the arched spring by including a spring leg retention support in the cavity. Preferred embodiments of the frame are illustrated by FIGS. 4 and 5. The frame is preferably constructed of rigid materials, for example, metal or plastic, more preferably metal.

Referring to FIG. 4 there is illustrated a magnetic head-to-media backer assembly 240 and a magnetic head 242. The assembly 240 includes an arched spring 244 and a magnetic head-to-media backer device frame 250 of the invention. The arched spring is of a length such that when it is depressed against the magnetic head it conforms to the contours of the cavity walls. The rigid frame has a cavity 252, defined at least by a pair of opposite walls 254, 256 shaped to hold the arched spring 244, bent in an arc with a center portion and two opposite leg portions. In a preferred embodiment the leg portions are captured at the gap 258 within the cavity between the walls and a center upstanding spring retention support 260 protruding from the base of the cavity. The center retention support is, for example, generally concave shaped with a flat top portion. Two fundamental changes in configuration have been adopted to address problems.

Firstly, the walls 254, 256 are formed with essentially straight portions 262, 264 on either side of a curved center portion with an internal radius, identified as R1, to provide a smooth, generally convex matched contour for the depressed arched spring. There are no sharply angled corners in the walls. In a preferred embodiment the straight portions are at right angles to each other. The arched spring tends to conform to the interior cavity shape as a high friction media is passed through the head/media interface. With the known cavity shapes the arched spring was allowed to fold into the sharp corner of the cavity, resulting in permanent deformation of the spring and functional failure of the spring after prolonged use. The radially curved feature of the invention provides improved support of the fragile arched spring during engagement with high friction media. Including the curved feature R1 allows the spring to conform to the shape of the cavity without folding and eliminates this failure and allows high friction media to be passed through the interface.

A second improvement feature is the retention support 260 added to the center of the cavity. The retention support is positioned so that the width of the gap between the base of the retention support and the inside wall of the cavity is slightly greater than the thickness of the spring. The width of the gap is between about one to about fifteen times the thickness of the spring, preferably between about five to about ten times the thickness of the spring. In a typical embodiment of the cavity design, the gap 258 is about 0.38 mm wide for a 0.038 mm thick spring. Thus the gap is sufficient to allow the spring to be inserted and captured between the walls and small enough to prevent significant sideways slippage of the spring legs. The legs of the spring are thus captured between the inside wall of the cavity and the base of the retention support and the retention support acts to constrain the arched spring from significant rotation about the center hole 266 of the cavity when high friction media is passed through the interface. Previous known cavity designs, without a center support (FIG. 2) or with a large gap between the cavity walls and the center support (FIG. 3) allow the spring to rotate about the center hole when high friction media is passed through the interface. Including a center retention support with a restricted gap width between the retention support and the wall captures the ends of the springs and eliminates the rotation of the spring about the center hole thus providing a more consistent support for the arched spring under high media friction conditions. The center retention support can be curved, for example generally hemispherical, or generally rectangular. The height of the retention support is such that when the spring, in contact with a magnetic media, is depressed by a magnetic head toward the cavity opening there is no contact between the media and the top of the retention support. In the known embodiment of the cavity design (FIG. 3) the support acts as a mechanical limit to the amount of depression of the depressed spring and contact of the media and the support can occur. It has been found that this contact is not necessary for supporting the spring and the magnetic media and is in fact detrimental when spliced media is used since the rigidly supported spring may interfere with the splice. It is desirable to maintain flexibility in the spring to allow for splices and other irregularities in the magnetic media.

The walls of the rigid frame are provided with locating holes 274 and 276 for positioning the backer device over corresponding locating pins on a mounting plate of a head backer assembly. In a preferred embodiment one hole 274 is round and the other 276 is generally obround to reduce the tolerance requirements for positioning of the frame over a pair of corresponding round locating posts. A center located mounting hole 278 is also provided in the area of the center retention support for accommodating a mounting screw.

The ends of the frame walls adjacent to the cavity opening are, preferably, generally triangular in shape to accommodate the magnetic head of the head backer assembly and to enable entry and exit of the magnetic media. Each triangle preferably is an obtuse-angled triangle having an outer angled corner of about 30°, an inner angled corner of about 10° and an obtuse angled corner, preferably of about 140°, over which the media is transported.

FIG. 5 illustrates another embodiment of a rigid frame 280 for a magnetic head-to-media backer device with a rectangular shaped retention support, 282. This embodiment also has a convex curved feature R2 and a restricted gap width between the retention support and the wall. In this embodiment U-shaped notches 284 and 286 are provided which serve both as locating features and as mounting features.

This invention provides a magnetic head-to-media backer device with an improved cavity design which includes a frame with generally convex shaped inner walls for preventing functional failure of the spring member. In a further improvement the cavity also includes a retention support for preventing rotation of the spring member about the center hole of the cavity. The height of the retention support is such that it does not contact the center of the spring and thus does not interfere with splices or irregularities on the magnetic media.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A magnetic head-to-media backer device for holding a spring member, the spring member being adapted to urge a flexible magnetic media into contact with a magnetic head, comprising:

a frame for holding the spring member therein, the frame having a cavity defined at least by a pair of opposite generally convex shaped side walls for bending the spring member into an arc with two opposite leg portions and a center portion, each leg portion having a desired thickness and an end, the center portion of the spring member protruding from a convex shaped opening to the cavity to permit the spring member to be depressed at least part way into the opening to conform the leg portions substantially against the convex surface of the side walls and a retention support with a base upstanding in the cavity, the retention support base spaced from the opposite side walls to constrain the leg portions of the spring member between the retention support base and the opposite side walls whereby significant rotation of the spring member within the opening is prevented, and the retention support is spaced from the cavity opening so that when the center portion of the spring member is depressed the portions of the spring member between each leg end remain separated from the retention support.

2. The device according to claim 1, in which each of the convex walls and the retention support base are spaced apart at a distance from about one to about fifteen times the thickness of each spring member leg.

3. The device according to claim 1, in which the shape of the retention support is either generally rectangular or generally hemi-spherical.

4. The device according to claim 1, in which each of the generally convex shaped side walls comprises a center curved portion between two straight portions.

5. The device according to claim 1, in which the frame comprises a straight longitudinal base, straight opposing latitudinal edges and a non-linear longitudinal edge opposite the longitudinal base interrupted by the convex shaped opening to the cavity, each portion of the non-linear longitudinal edge between the opening and the latitudinal edge having an obtuse-angled triangle shape for creating the convex shaped opening and to facilitate travel of the magnetic media over the magnetic head.

6. The device according to claim 5, in which the frame is generally rectangular.

7. The device according to claim 5, in which the longitudinal base comprises a pair of U-shaped notches for locating and mounting the device.

8. The device according to claim 1, in which the frame is manufactured out of a rigid material.

9. The device according to claim 8 in which the material is selected from metal and plastic.

10. The device according to claim 1, in which the frame has first and second locating holes extending there through for positioning the backer device.

11. The device according to claim 10, in which one of the first and second locating holes is circular and the other is generally obround.

12. The device according to claim 1, in which the frame has a mounting hole extending through the frame for passing a mounting screw there through.

13. A magnetic head-to-media backer device for holding a spring member, the spring member being adapted to urge a flexible magnetic media into contact with a magnetic head, comprising:

a frame for holding the spring member therein, the frame having a cavity defined at least by a pair of opposite side walls for bending the spring member into an arc with two opposite leg portions and a center portion, each leg portion having a desired thickness and an end, the center portion of the spring member protruding from a convex shaped opening to the cavity to permit the spring member to be depressed at least part way into the opening to conform the leg portions substantially against the surface of the side walls; and a retention support with a base upstanding in the cavity, the retention support base spaced from the opposite side walls to constrain the leg portions of the spring member between the retention support base and the opposite side walls whereby significant rotation of the spring member about the opening is prevented, and the retention support is spaced from the cavity opening so that when the center portion of the spring member is depressed the portions of the spring member between each leg end remain separated from the retention support.

14. The device according to claim 13, in which the frame is manufactured out of a rigid material.

15. The device according to claim 13, in which the frame comprises a straight longitudinal base, straight opposing latitudinal edges and a non-linear longitudinal edge opposite the longitudinal base interrupted by the convex shaped opening to the cavity, each portion of the non-linear longitudinal edge between the opening and the latitudinal edge having an obtuse-angled triangle shape for creating the convex shaped opening and to facilitate travel of the magnetic media over the magnetic head.

16. The device according to claim 13, in which the frame has first and second locating holes extending there through for positioning the backer device.

17. The device according to claim 16, in which one of the first and second locating holes is circular and the other is generally obround.

18. The device according to claim 13, in which the frame has a mounting hole extending through the frame for passing a mounting screw there through.

* * * * *